(12) United States Patent
Kline et al.

(10) Patent No.: US 6,472,667 B1
(45) Date of Patent: Oct. 29, 2002

(54) DATA REDUCTION ARCHITECTURE FOR NUCLEAR MEDICINE IMAGERS

(75) Inventors: Barry D. Kline, Cleveland Hts.; Jerome J. Griesmer, Kirtland, both of OH (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/722,132

(22) Filed: Nov. 24, 2000

(51) Int. Cl.$^7$ .................................................. G01T 1/24
(52) U.S. Cl. ........................ 250/370.09; 250/363.04; 250/363.09; 250/363.07; 378/901
(58) Field of Search ................. 250/363.04, 363.07, 250/363.09, 370.09; 378/901

(56) References Cited

U.S. PATENT DOCUMENTS

| | | | |
|---|---|---|---|
| 4,090,080 A | | 5/1978 | Tosswill |
| 4,262,207 A | | 4/1981 | Tosswill |
| 4,982,096 A | | 1/1991 | Fujii |
| 5,077,770 A | | 12/1991 | Sammon |
| 5,466,939 A | * | 11/1995 | Kumazawa et al. ... 250/363.04 |
| 5,967,983 A | | 10/1999 | Ashburn |
| 5,991,357 A | | 11/1999 | Marcovici |
| 6,046,454 A | | 4/2000 | Lingren et al. |
| 6,055,450 A | | 4/2000 | Ashburn |
| 6,091,070 A | | 7/2000 | Lingren et al. |

OTHER PUBLICATIONS

G.L. Zeng, et al. "Eigen Analysis of Cone–Beam Scanning Geometries." *Three–Dimensional Image Reconstruction in Radiation and Nuclear Medicine* © 1996 by Kluwer Academic Publishers, Netherlands, Pp. 75–86.

G.L. Zeng, et al., "A cone beam tomography algorithm for orthogonal circle–and–line orbit." *Phys. Med. Biol.*, 1992, vol. 37, No. 3, 563–577.

S. Webb, et al., "Monte Carlo modeling of the performance of a rotating circle–slit–collimator for improved planar gamma–camara imaging," *Phys. Med. Biol.*, vol. 37 No. 5, 1095–1108, 1992.

Mauderli, et al., "A Computerized Rotating Laminar Radionuclide Camera." *J. Nucl. Med.* 20::341–344 (1979).

Entine, et al., "Cadmium Telluride Gamma Camera," *IEEE Transactions on Phys.* vol. NS–26, No. 1:552–558 (1979).

Urie, et al., "Rotating Laminar Emission Camera with GE–detector," *Med. Phys.* 8(6):865–870 (1981).

Mauderli, et al., "Rotating Laminar Emission Camera with GE–detector," *Med Phys.* 8(6):861–876 (1981).

Malm, et al., "A Germanium Laminar Emission Camera," *IEEE Transactions on Nuclear Science*, vol. NS–29, No. 1:465–468m (1982).

Mauderli, et al., "Rotating Laminar Emission Camera with GE–Detector: Further Developments," *Med. Phys.* 14(6):1027–1031 (1987).

* cited by examiner

*Primary Examiner*—Constantine Hannaher
*Assistant Examiner*—Andrew Israel
(74) *Attorney, Agent, or Firm*—Fay, Sharpe, Fagan, Minnich & McKee, LLP

(57) ABSTRACT

A subject (10) is disposed adjacent a detector array (18) for the purposes of nuclear imaging. The subject (10) is injected with a radioactive isotope (14) and γ-ray emissions indicative of nuclear decay are detected at the detector array (18) these signals are processed and reconstructed into an image representation of the anatomy of the subject (10). A dual level arbitration system orders detected signals for ease of processing and efficiency of reconstruction. The first level of the arbiter monitors a group of individual detectors (22). It locks out any signal that arrives from its group of detectors if a previous signal is still being analyzed. This avoids paralyzation of the system. The second level of the arbiter consists of a plurality of memories, one for each group of individual detectors (22) that store an address and energy of each processed signal. These memories pass a token around among themselves, and if they possess the token, as well as data, they load that data onto a data collection bus, which transfers it to an event archive (44) for storage until enough data is collected to be reconstructed into an image of the subject (10).

19 Claims, 8 Drawing Sheets

MATCH TO FIG.6B

DATA REDUCTION ARCHITECTURE FOR NUCLEAR MEDICINE IMAGERS

BACKGROUND OF THE INVENTION

The present invention deals with the nuclear arts. It finds particular application in conjunction with electronics used in SPECT cameras and will be described with particular reference thereto. However, it is to be appreciated that the present invention may find application in PET and other nuclear cameras and the like and is not limited to the aforementioned application.

Nuclear imaging employs a source of radioactivity to image the anatomy of a subject. Typically, a radiopharmaceutical is injected into the patient. This radiopharmaceutical contains atoms that decay at a predictable rate. Each time an atom decays, it releases a γ-ray. These γ-rays are detected, and from information such as their detected position and energy, a representation of the interior of the subject is reconstructed.

Typically, a nuclear camera has one, two, or more detector heads. Each head has a large scintillator sheet, such as doped sodium iodide, which converts incident radiation into scintillations, i.e., flashes of light. An array of photomultiplier tubes is disposed in back of the scintillator to monitor for light flashes. The output of the photomultiplier tubes and associated circuitry indicates the coordinates of each scintillation on the sodium iodide crystal and its energy. Unfortunately, there are numerous non-uniformities and inaccuracies when using a large scintillator crystal and an array of photomultiplier tubes.

This type of detector is only capable of processing one nuclear event at a time. Γ-rays incident upon the detector temporally too close together are typically discarded, i.e., ignored. The reset time is determined in part by the afterglow of the crystals, and to a lesser extent, the processing time of the electronics.

Rather than using a single, large scintillator and photomultiplier tubes, others have proposed using an array of small scintillators, each optically coupled to a corresponding photodiode or other photoelectrical device which senses a scintillation in each individual scintillation crystal. Other types of individual solid-state detectors have also been suggested. These radiation-light-photodetection systems are again limited in speed by crystal afterglow. Moreover, energy-to-light conversion efficiency of the scintillators limits detector size, hence resolution.

The present invention provides a new and improved method and apparatus that overcomes the above referenced problems and others.

SUMMARY OF THE INVENTION

In accordance with one aspect of the present invention, a nuclear imaging apparatus is given. A source of radioactivity emits γ-rays that strike an array of solid state detector arrays. An array of electronics process nuclear decay event information from the detector arrays, and a reconstruction processor converts them into a human readable format.

In accordance with another aspect of the present invention, a nuclear camera is given. An array of groups of detectors detect incident radiation and send output signals in response. Signal processing circuits process the signals. First level arbiters decide which signals gain priority, and a second level arbiter orders the signals from the first level arbiters. A reconstruction processor the converts the signals to an image format.

In accordance with another aspect of the present invention, a method of nuclear imaging is given. Γ-rays are detected that produce signals and are arbitrated upon. The signals are then reconstructed into an image representation.

In accordance with another aspect of the present invention, a logic circuit arbitrator is given. Signal generators generate signals that are selectively processed by signal processors, labeled, and sent to temporary memories where they wait for a data collection bus. A token allows the signals to be passed from the temporary memories to the data collection bus.

One of the advantages of the present invention is that it decreases the effective event processing time of the system.

Another advantage resides in a direct detection of incident radiation.

Another advantage resides in its compact size.

Another advantage is that it achieves concurrent detection of radiation events.

Yet another advantage is that excellent spatial resolution is achieved.

Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Figure 1:
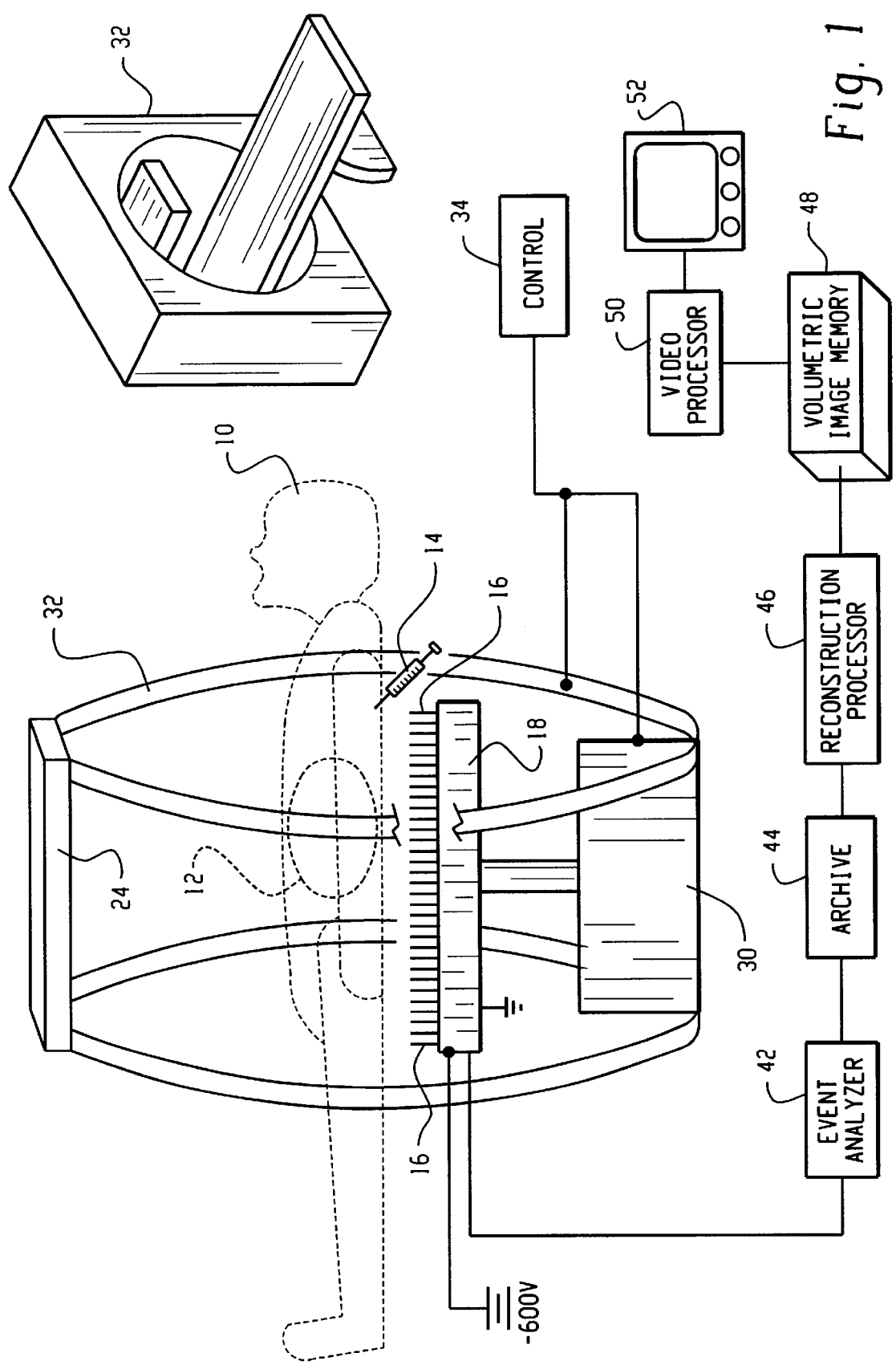
FIG. 1 is a diagrammatic illustration of a nuclear imaging device in accordance with the present invention.

With reference to FIG. 1, a region of interest of a subject 10 defines an imaging region 12. In an emission tomography embodiment, a radioactive isotope 14, such as a radiopharmaceutical is injected into the or subject, near a region to be imaged. For example, if a physician wants to view a blockage in the aorta, the isotope is injected into the bloodstream upstream from the blockage. The radioisotope is monitored as it is carried by the blood to image the circulatory system. As another example, the radiopharmaceutical which is preferentially absorbed by tumors or other tissue of interest is injected into the circulatory system. The radiopharmaceutical is monitored after absorption by tissue of interest to image the tissue of interest.

As quantum physics predicts, atomic nuclei of the radioactive isotope decay over time. Energy is released at the time of decay in the form of a photon, more specifically, a γ-ray of characteristic energy.

Many of the γ-rays produced during an emission imaging process are lost, propagating in useless directions. However, some of the γ-rays pass through collimators 16, thin tungsten vanes in the preferred embodiment, and strike a detector array 18. In the preferred embodiment and with reference to FIG. 2, the detector array 18 includes a 4×24 array of cadmium zinc telluride (CZT) crystal arrays 20, each having 4×8 individual detectors 22.

For transmission tomography, a radiation source 24 is disposed across the subject from the detector head. Preferably, the transmission source is a radioisotope with a different characteristic energy from the injected radiopharmaceutical.

In the preferred embodiments, the detector array 18 and collimators 16 are mounted on a mechanized drive 30 go that moves the detector array. Preferably, the array moves with lateral rotational components of motion, although various trajectories within the detector head are contemplated. Alternately, the detector array is stationarily mounted within a detector head. In tomographic applications, the detector head is indexed around the region of interest.

In the preferred embodiment, the detector head is mounted on a rotatable gantry 32 which extends fully around the subject 10. A motor control 34 selects a range of motion of the detector array 18, if any, within the rotatable gantry and rotation of the gantry 32 stepwise or continuously around the image region.

In SPECT imaging, the collimator 16 limits access to the detector array 18 to radiation following prescribed paths or trajectories, e.g., parallel vane collimators define trajectories in a slice perpendicular to the plane of the detector array 18. In this manner, each radiation event defines a trajectory along which a radioisotope decayed. If the movable gantry 32 remains stationary, the detectors define a projection image of the radioisotope distribution in the region of interest.

An array of event analyzers 42 determines the location which each events strikes each group of the detector arrays, i.e., which detector within a group receives it and the amount of energy of the radiation event. The radiation events collected at each stationary position of the detector array are stored in an archive 44. When the rotatable gantry 32 is rotated to different angular positions around the subject, a plurality of projection images from different angular orientations are collected. A reconstruction processor 46 backprojects or otherwise reconstructs the data from the archive memory 44 into a volumetric image representation for storage in a volumetric image memory 48. A video processor 50 under operator control selectively withdraws portions of the volumetric image representation and converts them into appropriate form for display on a video or other human readable monitor 52.

Figure 2:
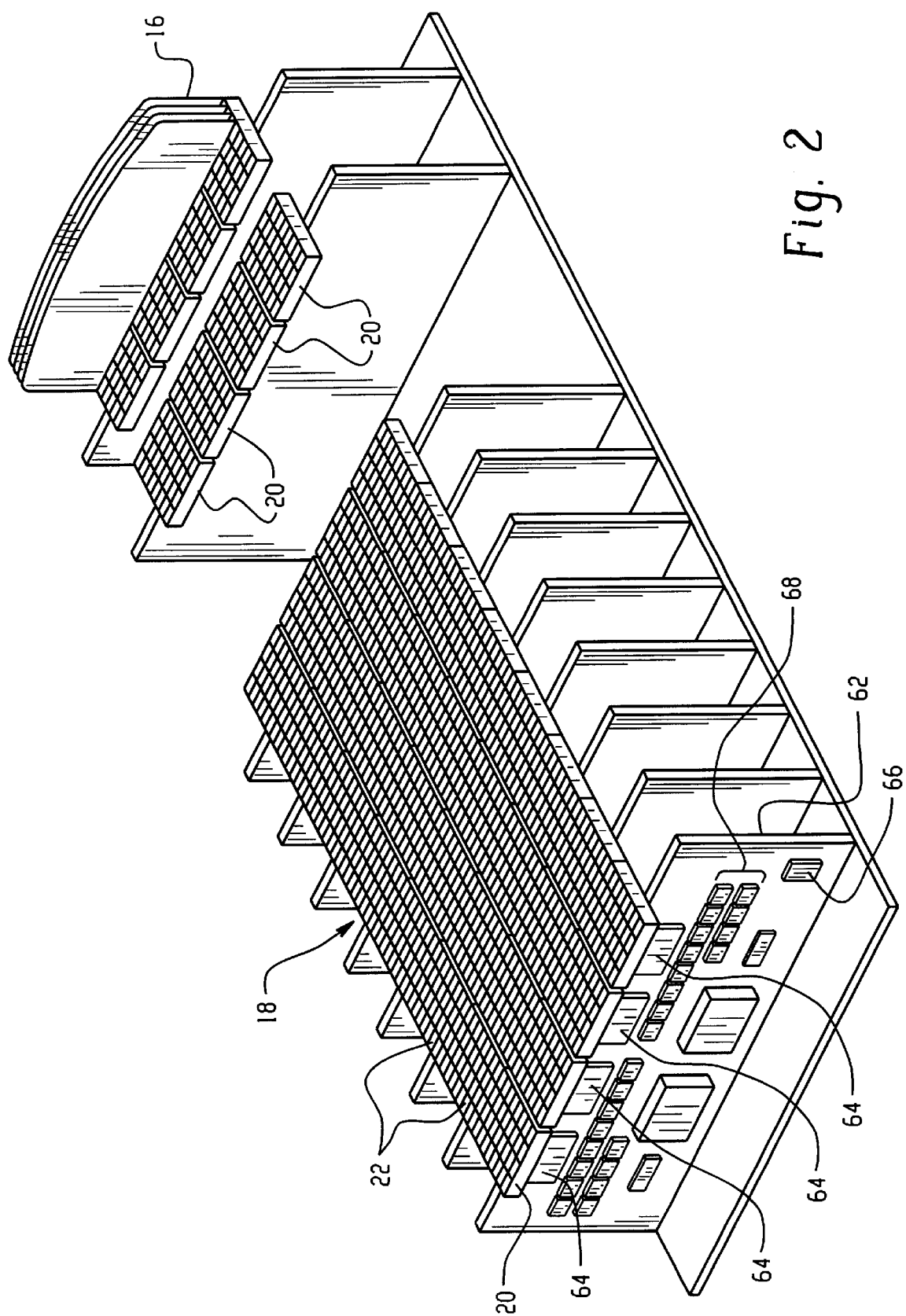
FIG. 2 is a perspective view of the detector array.
Figure 3:
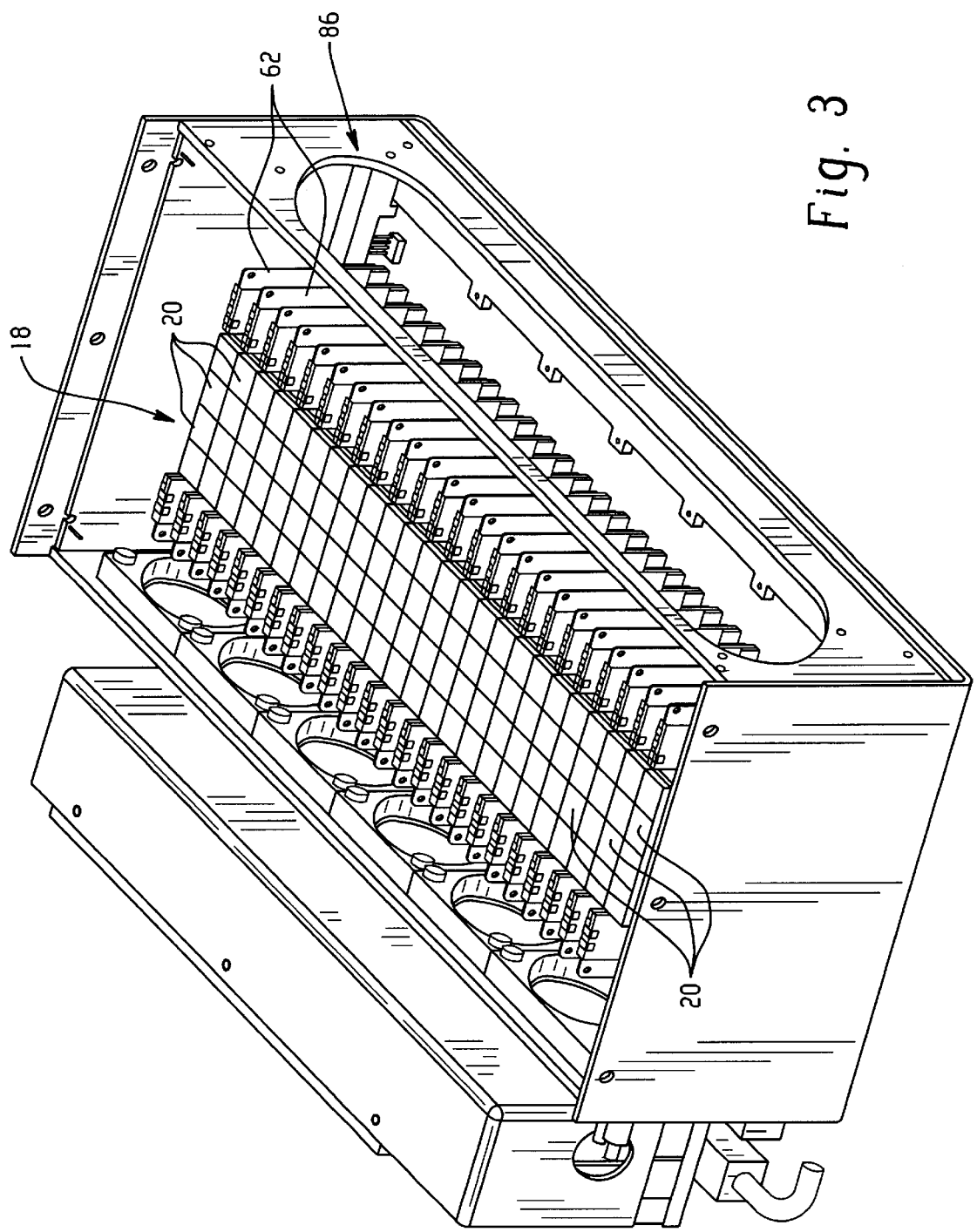
FIG. 3 is a perspective view of the detector array, circuit boards, and cooling fans.

With reference to FIG. 3 and continuing reference to FIGS. 1 and 2, received γ-rays are detected and their energy measured by electronics attached to the detector array 18. In the preferred CZT embodiment, a potential difference of −600 V is applied across the detector arrays. P-ASICS or other low noise pre-amplifier circuits process and shape the current pulses from the detector array that result from detected γ-rays. Four P-ASICs are mounted on each side of a circuit board or pair of back-to-back circuit boards 62 that support four of the detector arrays.

The CZT crystals rely on propagating electrons rather than scintillations to indicate detection of events. The high voltage potential sets up a substantially uniform electric field in the detector array. This electric field loosens the bonds of electrons that are naturally found in the CZT. When a γ-ray strikes the detector, it liberates many of these electrons from their bonds to local nuclei, and they get caught in the electric field and are propagated to the other side of the detector. It is important to note that the detectors of the preferred embodiment are solid state detectors that rely on the propagation of charge to identify a radiation event.

Each time a γ-ray strikes one of the detectors, it releases electrons producing an output electrical pulse. Associated electronic components 64 which are powered by a voltage regulator 66 amplify each pulse, spread the pulse, measure the area under the pulse, convert the area to an output, otherwise processes the received radiation data. Multiplexers 68 multiplex the resulting signal into a series of outputs to portions of the event analyzer 42 mounted remotely.

The electrical signals detected by the array 18 are ordered and processed. The data acquisition architecture of the preferred embodiment uses two levels of arbitration and data reduction to pass signals from the 3072 individual detectors 22 to a single output port at very high event rates. First, analog signals from the 3072 individual detectors are collected into more manageable groups, in the preferred embodiment, 48 independent groups of 64 signals. Within each group of 64 signals, a first level of arbitration selects a signal of interest, and provides an output channel for that signal, along with a digital representation of that signal's address. It is to be understood that the number of independent signals may be smaller or larger, depending on the size of the detector array 18.

The first level arbiter consists of 64 independent signal comparators, each of which provides a digital output trigger signal when the corresponding analog signal input exceeds an adjustable threshold voltage. The first digital signal to reach the arbitration logic, when the logic is in a ready state, wins the arbitration contest. The logic then encodes a 6-bit address representing the channel number of the digital signal which triggered it, enables the analog multiplexer 68 to send the selected analog signal to an output port, provides a composite trigger signal indicating to subsequent circuitry that an analog signal has been selected for processing, and locks out any further triggering events until subsequent circuitry is finished extracting the energy information from the signal. This property of the logic design renders it immune from (and thus not paralyzable by) additional radiation events from other detectors in the arbitration group while an individual pulse is being processed.

The first level arbitration logic returns to a ready state (reset) by a signal from subsequent circuitry indicating that the energy information (peak value of the pulse) has been determined. The remaining portion of the original analog signal is then ignored, and the arbitration logic returns to the ready state, indicating accept new triggering inputs.

The first level arbitration logic operates fast enough to provide the analog signal through an analog multiplexer prior to the signal reaching its peak (100 s of nanoseconds). The logic also operates fast enough to inhibit any possible additional triggering inputs from producing an erroneous arbitration address (10 s of nanoseconds).

Figure 4:
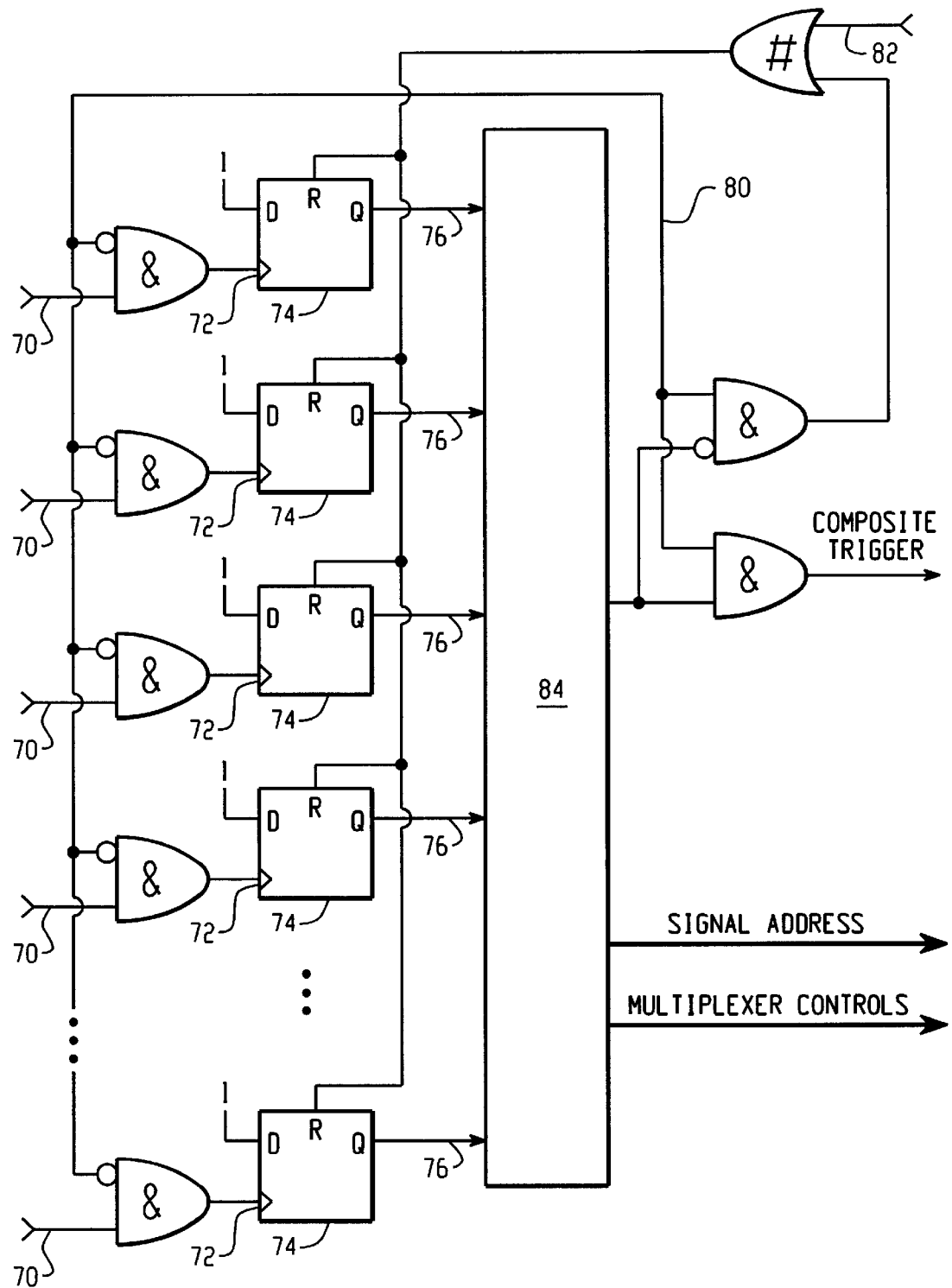
FIG. 4 is a circuit that performs of a first level of arbitration.

With reference to FIG. 4, the multiplicity of digital trigger signals 70, 64 in the preferred embodiment, each drive a clock input 72 of a flip-flop 74. If the logic is currently ready, the flip-flop 74 sensing a transition on its clock input 72 sets an output bit 76 true. Logic implementing a Boolean "OR" function produces a composite trigger signal 80 when any of the input flip-flops have been set. This composite trigger signal 80 remains true until all of the input flip-flops 74 have been reset by a done signal 82 from subsequent external circuitry indicating that the energy information (peak value of the pulse) has been determined. The composite trigger 80 thus also indicates that the logic is not in a ready state to accept further inputs, and therefore may be fed back into an inverted condition to all of the flip-flops to inhibit any of them from being set true by additional individual triggering inputs.

Figure 5:
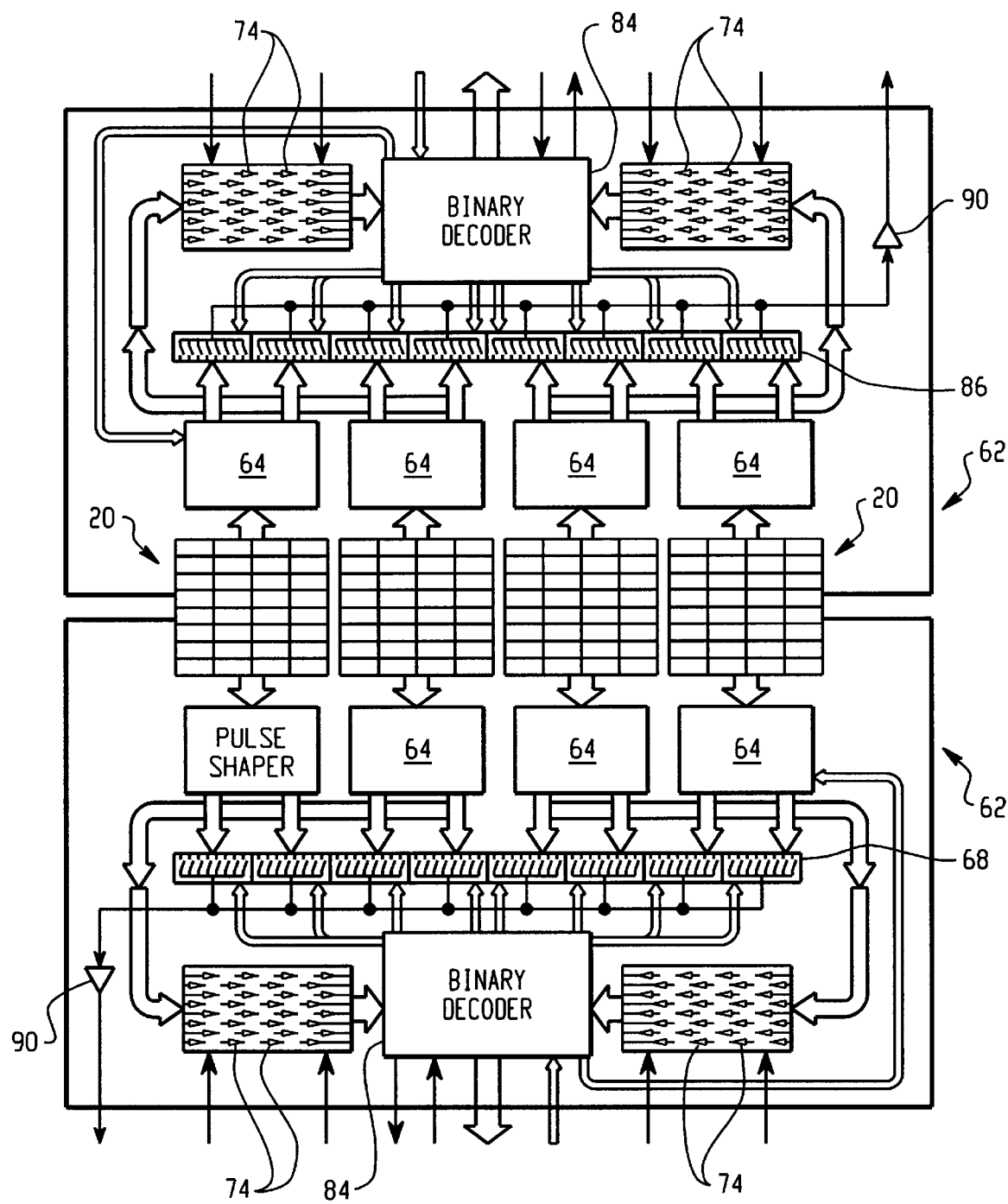
FIG. 5 is a diagram of the circuit boards associated with each line of detector arrays.

With reference to FIG. 5 and continuing reference to FIG. 4, when any of the output bit signals 76 are set true, a unique address is generated to represent which of the multiple trigger inputs 70 won the arbitration. This operation is preferably done with a simple binary decoder 84 in which output bit is set depending on its state in the binary representation of the channel number. Any decoding which provides a unique address for any single input 76 may be used. This decoder logic also provides the enabling signals to analog multiplexers 68 to pass the selected analog signal to a first level output port 90.

In the event that more than one trigger input 70 becomes active before the composite trigger signal 80 can be fed back into the input flip-flops 74, all are ignored. Optionally a more complex implementation of the arbitration logic examines the 64 inputs 70 to find out their trigger times and selectively chooses one among them and vetoes any others.

The first level arbitration logic has additional circuitry to "close the loop" and provide the reset signal 82. This is circuitry which determines and reports the peak value of the pulse following a successful arbitration. The circuitry to perform this task might be implemented in several different ways, such as analog peak detectors employing diodes or sample/hold amplifiers. The method of the preferred embodiment uses a free running ADC of relatively high sampling speed (20 MHZ) with additional control logic to detect the occurrence of the signal peak and average (sum) samples of the signal around the peak to improve the resolution of the reported peak value. Following the determination and saving of the peak value, The control logic releases the original arbitration logic with the reset signal 82.

Figure 6A:
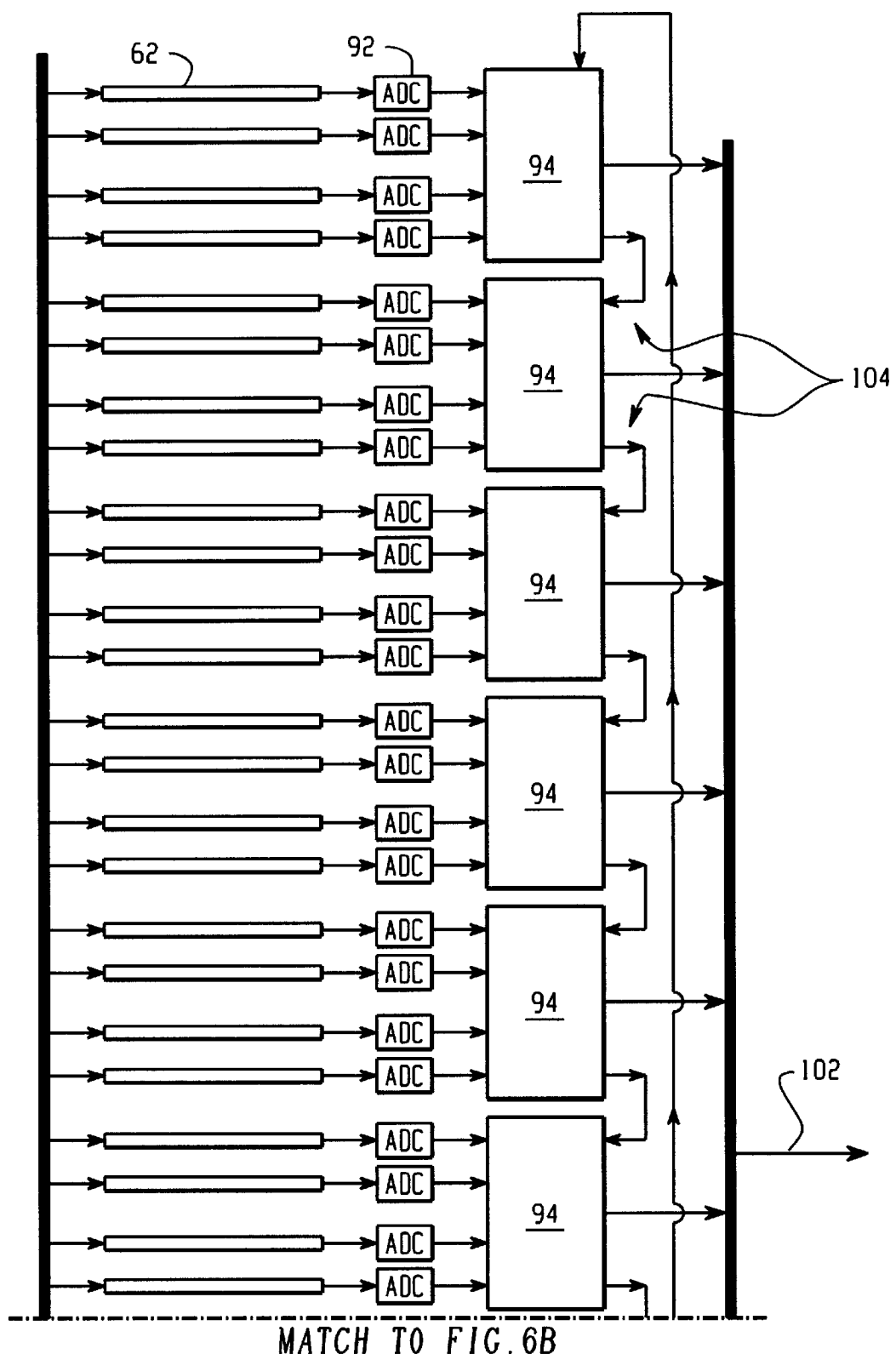
FIG. 6 is a block diagram of digital readout circuitry that performs a second level of arbitration.
Figure 6B:
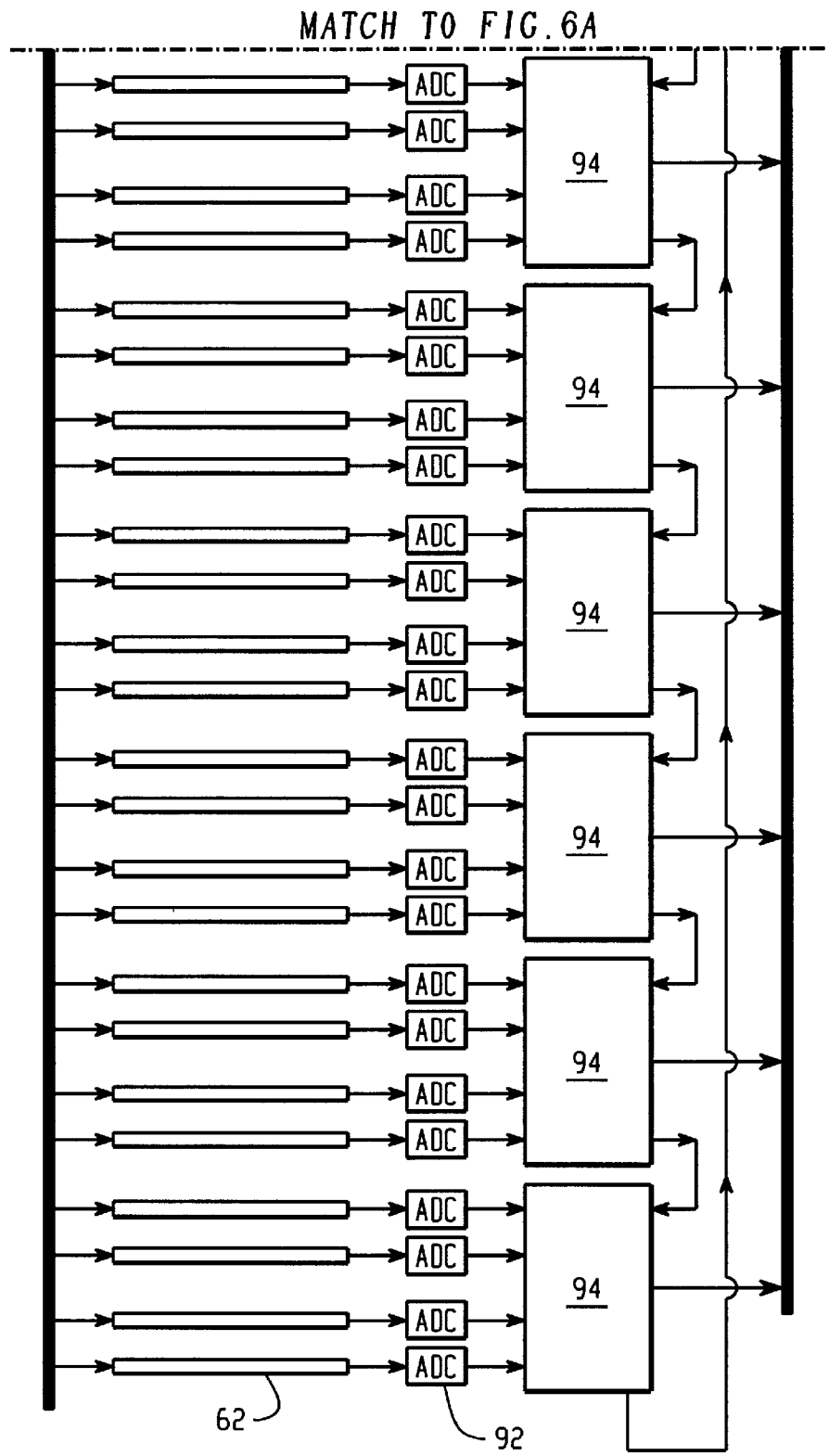

With reference to FIG. 6, the signal processing logic for the peak detection allows a highly accurate result (12 bits resolution) from relatively low cost, low resolution (10 bit) analog to digital converters by over sampling the analog pulse (sampling period pulse duration/20), and summing (averaging) four samples near the maximum value observed in an ADC output data stream 92. A simple magnitude comparitor 94 indicates when the signal has stopped rising, and by means of a digital storage pipeline, two samples preceding and two samples following the detected peak sample are added in a digital accumulator. The sum of the four 10 bit signals provides the 12 bit output signal.

The operation of the peak detector pipeline and accumulator is controlled by a logical state machine, which responds to a natural progression of events following a trigger, such as observing a monotonically-increasing leading edge, peak value, and monotonically decreasing values following the peak. This same state machine controller is programmed to trap and exit from states which do not follow the natural progression of signal behavior, such as electronic "glitches" or radiation induced "pile-up" events, which would render the reported energy value inaccurate.

The first level arbitration logic requires a number of individual sensors 22 to gain access to a common output port. This naturally reduces the possible bandwidth of the data acquisition system below what is achievable with an output port per sensor. However, a tradeoff in cost vs. performance/complexity is advantageous in a system with thousands of sensors. In a non-paralyzable system such as just described, the point at which 20% of events are lost due to the unavailability of the processing channel is a common figure of merit for system throughput.

$$R_{out}=R_{in}/(1+R_{in}*DT)=0.8*R_{in}$$

where DT is the dead time associated with an event to be processed. If the DT is 2 $\mu$s then the 20% loss rate occurs with an input rate $R_{in}$=125,000 events/sec, and $R_{out}$=100,000 events/sec. On the other hand, if the detection system processes each sensor individually, the achievable throughput rate is multiplied by the number of sensors. Without the 64:1 arbitration, this would equate to $6.4 \times 10^6$ events/second.

The total throughput of the system is maintained by having a large number of these first level arbiters. In the case of a system with 3072 sensors, 48 first level arbiters each channel 64 sensors to one peak detector. Thus, for the system, the 20% loss point occurs with an event rate of $R_{in(system)}$=48×125,000 events/sec=$6.0 \times 10^6$ events/second, and an output rate of $R_{out(system)}$=48×100,000 events/second=$4.8 \times 10^6$ events/sec.

The data acquisition process of the described embodiment has 48 independent arbiters each choosing 64 possible data sources, and producing a digital measurement of each of those sources. The second level arbitration provides for access of any of these measurements to a single output port for eventual storage in the event archive 44.

In the second level arbitration, the data from individual peak detectors is stored in temporary memory to await access to a second level output port 102. Each peak detector provides an energy measurement, as well as the address of the sensor pixel which won the first level arbitration to that peak detector. At the temporary memory in the second arbitration level, additional address bits are also stored indicating which peak detector provided the data.

The peak detectors and temporary memory are preferably organized such that a number of peak detectors arbitrate for access to a common memory. The number of peak detectors per independent temporary memory block may vary based on system cost and complexity constraints. Each temporary memory is designed to assert a "data ready" flag signal indicating to an external data collection bus that it has received data from at least one of its contributing peak detectors. Before data from one of the temporary memories can be placed on the external data collection bus, additional address bits are stored indicating which temporary memory provided the data.

The arbitration for the output port from the individual temporary memories is controlled by a tokenring scheme 104. In this scenario, a "token" signal is passed from one memory to the next in a loop fashion. If the receiving memory has its "data ready" flag set, that memory is permitted to place the data from its next available address on the output data collection bus, assert a "data valid" strobe on the bus, and then pass the token (supplies a signal) to the next memory in the loop. If the receiving memory does not have its "data ready" flag set, it simply passes the token to the next memory without placing any data or "data valid" strobe on the It is to be understood that alternate embodiments of the present invention are easily scalable to include more or fewer individual arbiters in the loop.

Figure 7:
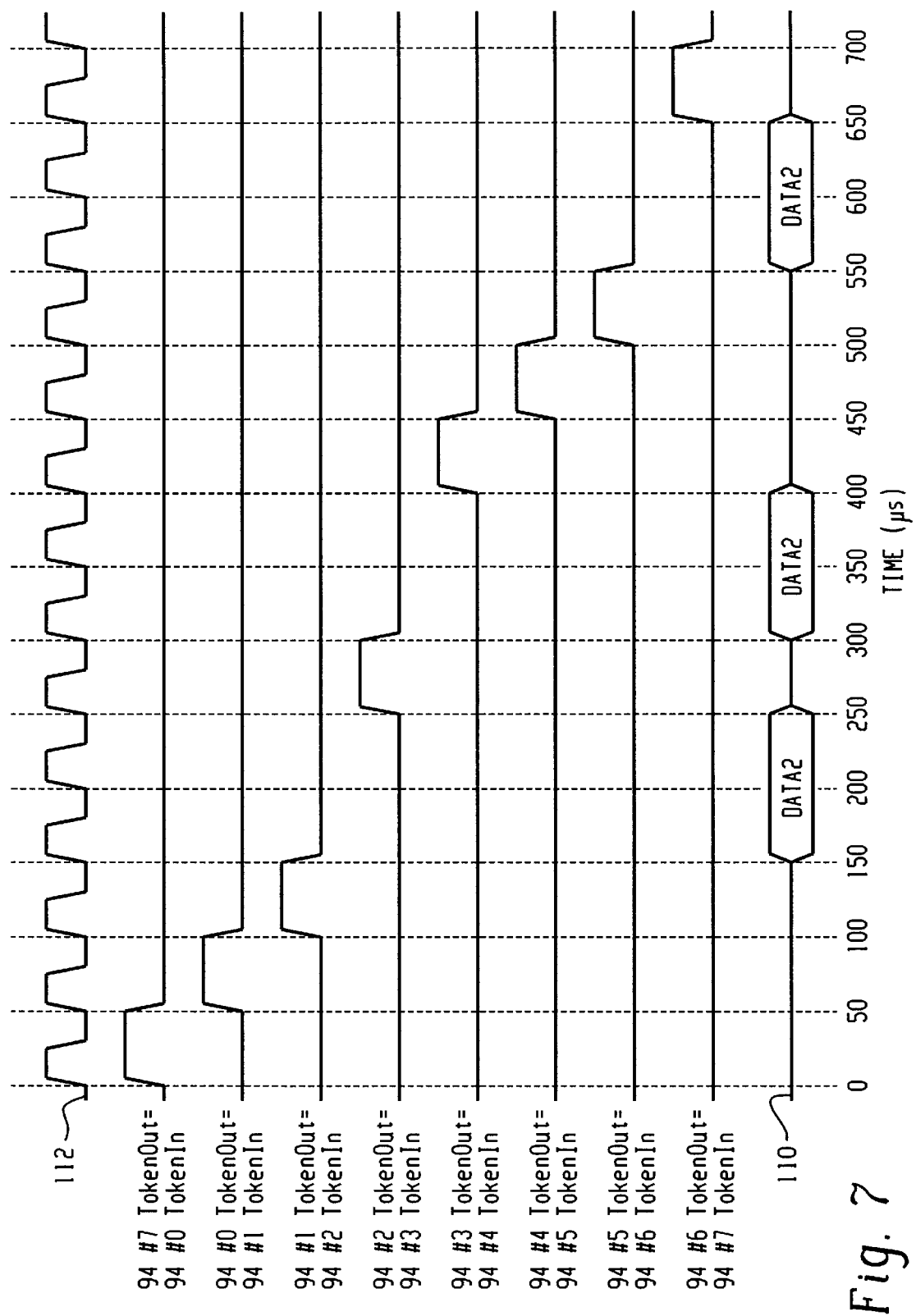
FIG. 7 is a timing diagram for the second arbitration level.

With reference to FIG. 7, a sample token ring scheme is given. In this example, one token is being passed around between eight magnitude comparitors 94. Comparitors 2, 3 and 6 simultaneously have data ready, and have their data ready flags set. When the token reaches one of the comparitors 94 that has data ready, the data is transferred to a motherboard data bus 110, and on its way to the event archive 44. For comparitors 94 that do not have a data ready flag set, the token is passed on in the next clock cycle. The first line 112 is a motherboard clock, mediating any data transfers.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A nuclear imaging apparatus comprising;
   at least one isotope which decays and emits γ-rays;
   a solid state detector means for detecting the γ-ray and generating corresponding event information;
   a plurality of processing means for processing the event information from each detector means;
   a first level arbitration means for ordering the event information from each processing means;
   a second level arbitration means for ordering the event information from the first level arbitration means;
   a reconstruction means for processing the event information into human readable format.

2. The nuclear imaging apparatus as set forth in claim 1 within the event information includes:
   signals indicative of magnitudes and addresses of each detected γ-ray; and
   wherein the second level arbitration means includes:
      a temporary memory means for temporarily storing the magnitudes and addresses;
      a data collection bus for transferring the magnitudes and addresses from the temporary memory means to an event archive; and
      a token means for enabling the temporary memory means to pass the magnitudes and addresses to the data collection bus.

3. A nuclear imaging apparatus comprising:
   at least one source of radiation that emits γ-rays by nuclear decay;
   an array of solid state detector arrays for detecting γ-rays and generate corresponding detector signals;
   an array of electronics that each process the detector signals from one of the detector arrays;
   an array of first level arbitration systems that order the detector signals for each detector array for processing;
   a second level arbitration system that orders the detector signals from the array of first level arbitration systems;
   a reconstruction processor that processes the detector signals into human readable format.

4. The nuclear imaging apparatus as set forth in claim 3, wherein each array of detectors includes:
   a multi-channel cadmium-zinc-telluride array.

5. The nuclear imaging apparatus as set forth in claim 3, further including:
   tungsten plates disposed parallel to one another for collimating the γ-rays in one dimension.

6. The nuclear imaging apparatus as set forth in claim 3, wherein the first level arbitration system monitors a portion of the array of arrays and assigns priority to the detector signals received therefrom.

7. The nuclear imaging apparatus as set forth in claim 6, wherein the second level arbitration system collects analyzed data prioritized by the first level arbitration system, and passes the data to an event archive.

8. The nuclear imaging apparatus as set forth in claim 3, further including electronics disposed on circuit boards that are disposed:
   parallel with respect to one another;
   adjacent the detector array; and,
   perpendicular to the detector array.

9. A nuclear imaging apparatus comprising:
   at least one source of radiation;
   an array of solid state detector arrays for detecting the radiation from the source as radiation events;
   an array of electronics that includes a plurality of event analyzers that determine event information, the event information including:
      a logical truth of a received radiation event;
      a location of the individual detector at a time it received the radiation event; and,
      an energy of the received radiation event;
   a reconstruction processor that processes the event information into human readable format.

10. The nuclear imaging apparatus as set forth in claim 9, further including an event archive that receives and stores the event information.

11. A nuclear camera comprising:
   an array of detectors which each detect incident radiation and output a signal in response to received radiation, the detector array being divided into a plurality of groups of detectors;
   a plurality of signal processing circuits, each detector group being connected with a corresponding, dedicated group of the signal processing circuits such that each output signal is processed;
   a plurality of first arbitration systems, each first arbitration system being connected with a corresponding, dedicated detector group for arbitrating and ordering the processed output signals from its corresponding detector group;
   a second arbitration system connected with the plurality of first arbitration systems for arbitrating and ordering the output signals from the plurality of first arbitration systems; and,
   a reconstruction processor which reconstructs the output signals from the second arbitration system into an image representation.

12. The nuclear camera as set forth in claim 11, wherein each group of detectors has one dedicated signal processing circuit, each signal processing circuit being in parallel to each other signal processing circuit and temporally independent from each other signal processing circuit.

13. The nuclear camera as set forth in claim 11, wherein the array of detectors includes a cadium zinc telluride solid state array.

14. The nuclear camera as set forth in claim 11, further including:
   an address encoder that encodes an address representing a detector channel that triggered an arbitration logic with a signal;
   an analog multiplexer that sends the signal to an output port;
   a composite signal generator that provides a composite trigger signal indicating to subsequent circuitry that the signal has been selected for processing;
   a lock-out circuit that locks out subsequent signals until the arbitration logic has returned to a ready state; and, a plurality of temporary memories that store data until the memories receive a token signal and a data collection bus comes to collect the data.

15. A method of nuclear imaging comprising:

detecting γ-ray radiation from a subject;

arbitrating an order in which the detected γ-ray radiation is recognized, the step of arbitrating including:
a first level of arbitration; and,
a second level of arbitration;

reconstructing the detected γ-ray radiation into an image representation of the subject.

16. A nuclear imaging apparatus comprising:

a means for detecting γ-rays from a subject;

a means for arbitrating an order in which the γ-rays are detected including:
a means for encoding an address representing a detector channel that triggered an arbitration logic with a signal;
a means for enabling an analog multiplexer to send the signal to an output port;
a means for providing a composite trigger signal indicating to subsequent circuitry that the signal has been selected for processing; and,
a means for locking out subsequent signals until the arbitration logic has returned to a ready state;

a means for reconstructing the detected γ-rays into an image representation of the subject.

17. The nuclear imaging apparatus according to claim 16, further including:

a second arbitrating means for storing data in temporary memories until the memories receive a token signal and a data collection bus for collecting the data.

18. A logic circuit arbitrator comprising:

a plurality of signal generators that generate signals in response to photonic stimuli;

a first signal processor that monitors a group of the signal generators for generated signals and selectively measures magnitudes of, and addresses to the signals;

a temporary memory that stores the magnitudes and addresses of the generated signals until such time that a data collection bus tranfers them to an event archive; and, a token that allows the temporary memory to pass the magnitudes and addresses of the stored information to the data collection bus.

19. The logic circuit arbitrator as set forth in claim 18, further including:

a plurality of their signal processors in parallel with the first signal processor, each signal processor being independent of each other signal processor.

* * * * *